Sept. 6, 1960 T. T. BUNCH ET AL 2,951,403
APPARATUS FOR STRIPPING A SHEATH OF
PLASTIC MATERIAL FROM A CORE
Filed March 25, 1959 4 Sheets-Sheet 1
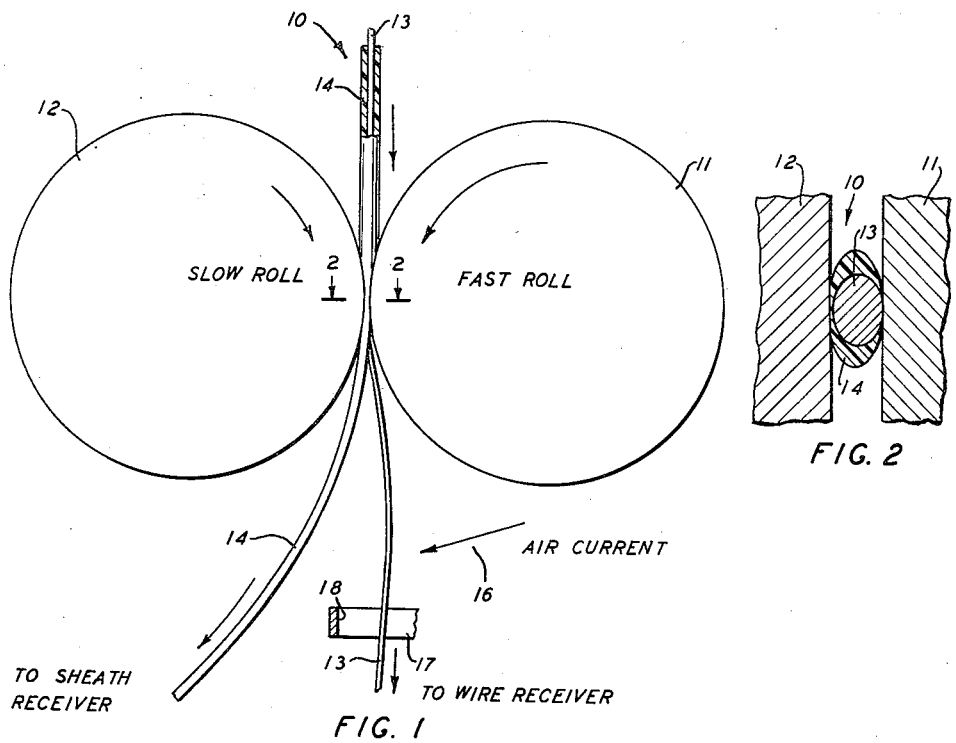
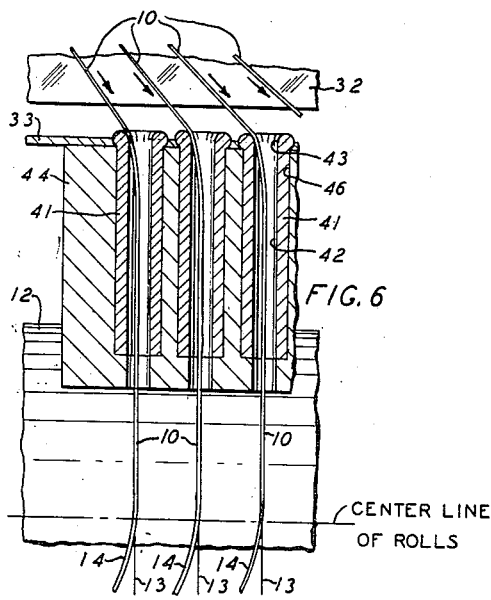
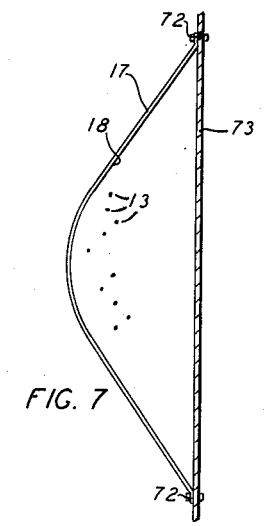
INVENTORS
T. T. BUNCH
M. G. DINSMORE, JR.
G. E. HENNING
BY H. G. Winegar
ATTORNEY INVENTORS
T. T. BUNCH
M. G. DINSMORE, JR.
G. E. HENNING
BY H. J. Winegar
ATTORNEY Sept. 6, 1960 T. T. BUNCH ET AL 2,951,403
APPARATUS FOR STRIPPING A SHEATH OF
PLASTIC MATERIAL FROM A CORE
Filed March 25, 1959 4 Sheets-Sheet 4

INVENTORS
T. T. BUNCH
M. G. DINSMORE, JR.
G. E. HENNING.
BY H. J. Winegar
ATTORNEY

United States Patent Office 2,951,403
Patented Sept. 6, 1960

2,951,403

APPARATUS FOR STRIPPING A SHEATH OF PLASTIC MATERIAL FROM A CORE

Tillman T. Bunch, near Ashland, Md., Marion G. Dinsmore, Jr., Williamsville, N.Y., and George E. Henning, Baltimore, Md., assignors to Western Electric Company, Incorporated, New York, N.Y., a corporation of New York Filed Mar. 25, 1959, Ser. No. 801,888

1 Claim. (Cl. 81—9.51)

The present invention relates generally to apparatus for stripping a sheath of plastic material from a relatively strong core. More particularly, the invention relates to apparatus for reclaiming sheathed wire by splitting the sheath longitudinally, by separating the split sheath from the bare wire, and by collecting the separated sheath and the bare wire in separate receivers.

Accordingly, an object of the invention is to provide new and improved apparatus for stripping a sheath of plastic material from a relatively strong core.

A more specific object of the invention is to provide apparatus for stripping a plastic sheath, such as polyethylene or polyvinyl chloride, from a copper wire to enable reclaiming of plastic-insulated wire.

A further object of the invention is to provide apparatus for reclaiming insulated wire by splitting a plastic sheath longitudinally along one side, by separating the split sheath from the bare wire, and by collecting the separated sheath and the wire in separate receivers.

The above and other objects are accomplished, according to certain features of the invention, by passing a sheathed core to be stripped between a pair of rolls, spaced from each other a distance of the order of the diameter of the core, while rotating the rolls so that the sheathed core passes therebetween and at different peripheral speeds so that the sheath is split longitudinally as the sheathed core passes between the rolls.

Preferably, the peripheral speed of the slower roll is between 70 and 95% of the peripheral speed of the faster roll, and the two rolls are spaced apart a distance slightly less than the diameter of the core. With this arrangement, it has been found that the sheath splits longitudinally along the side adjacent to the faster roll.

According to other features of the invention, the split sheath is continuously separated from the bare core and the separated sheath and the bare core are directed to separate receivers. This separation is preferably accomplished by directing a current of air against the split sheath and bare core after they emerge from the rolls, the air movement being of such magnitude and direction as to carry the split sheath away from the bare core to a container therefor, while the bare core drops into another container. In addition, it is preferred to restrain the bare core against following the path of the air current.

Other objects, advantages and features of the invention will appear from the following detailed description of a specific embodiment thereof, when read in conjunction with the appended drawings, in which:

Fig. 1 is a simplified, diagrammatic illustration of a stripping apparatus in accordance with the principles of the invention;

Fig. 2 is an enlarged, fragmentary sectional view illustrating the stripping apparatus, taken generally along the line 2—2 of Fig. 1 in the direction of the arrows;

Figure 3:
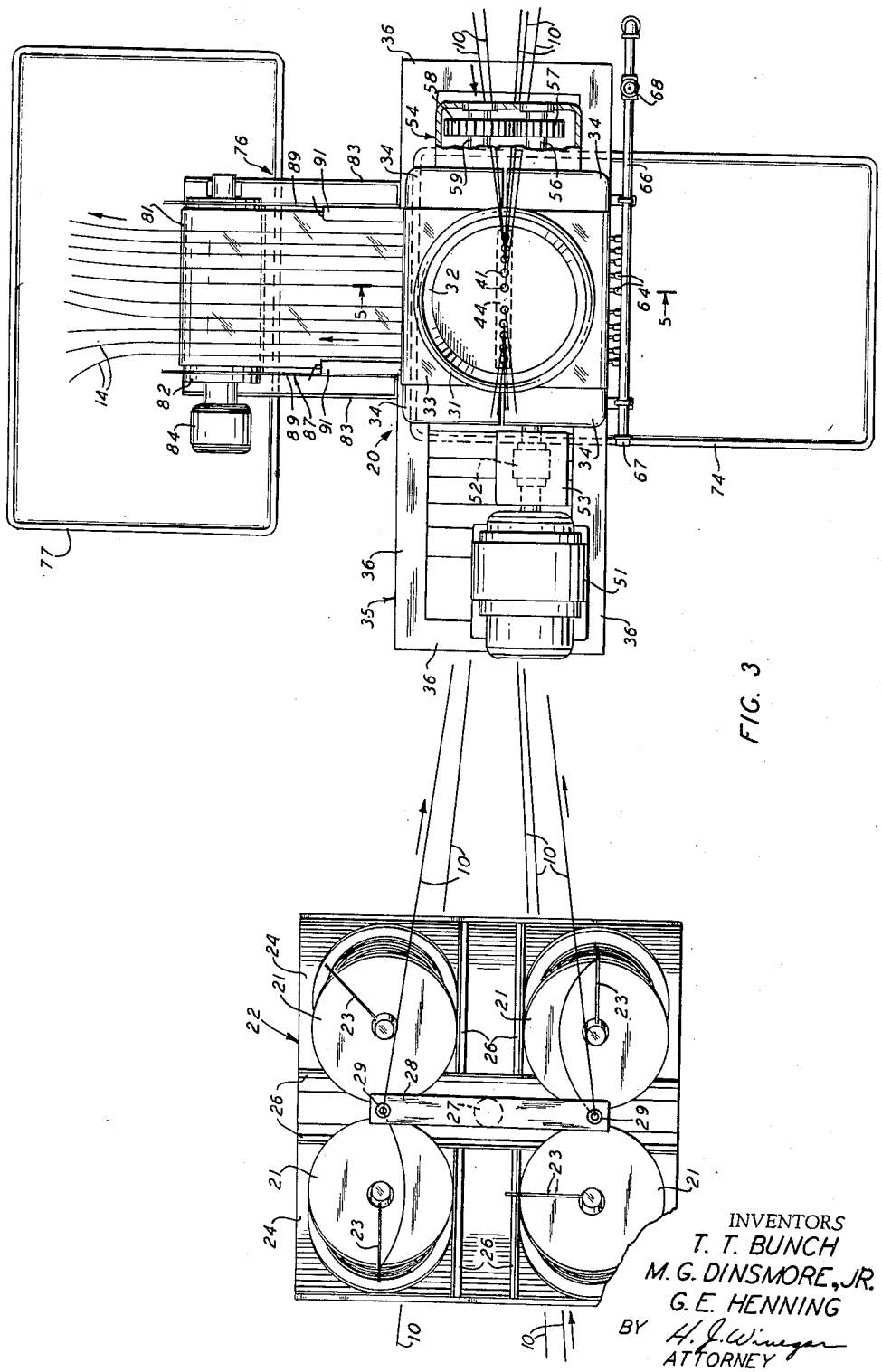
Fig. 3 is a plan view of a specific apparatus embodying certain principles of the invention, with portions broken away to reveal structural details.
Figure 4:
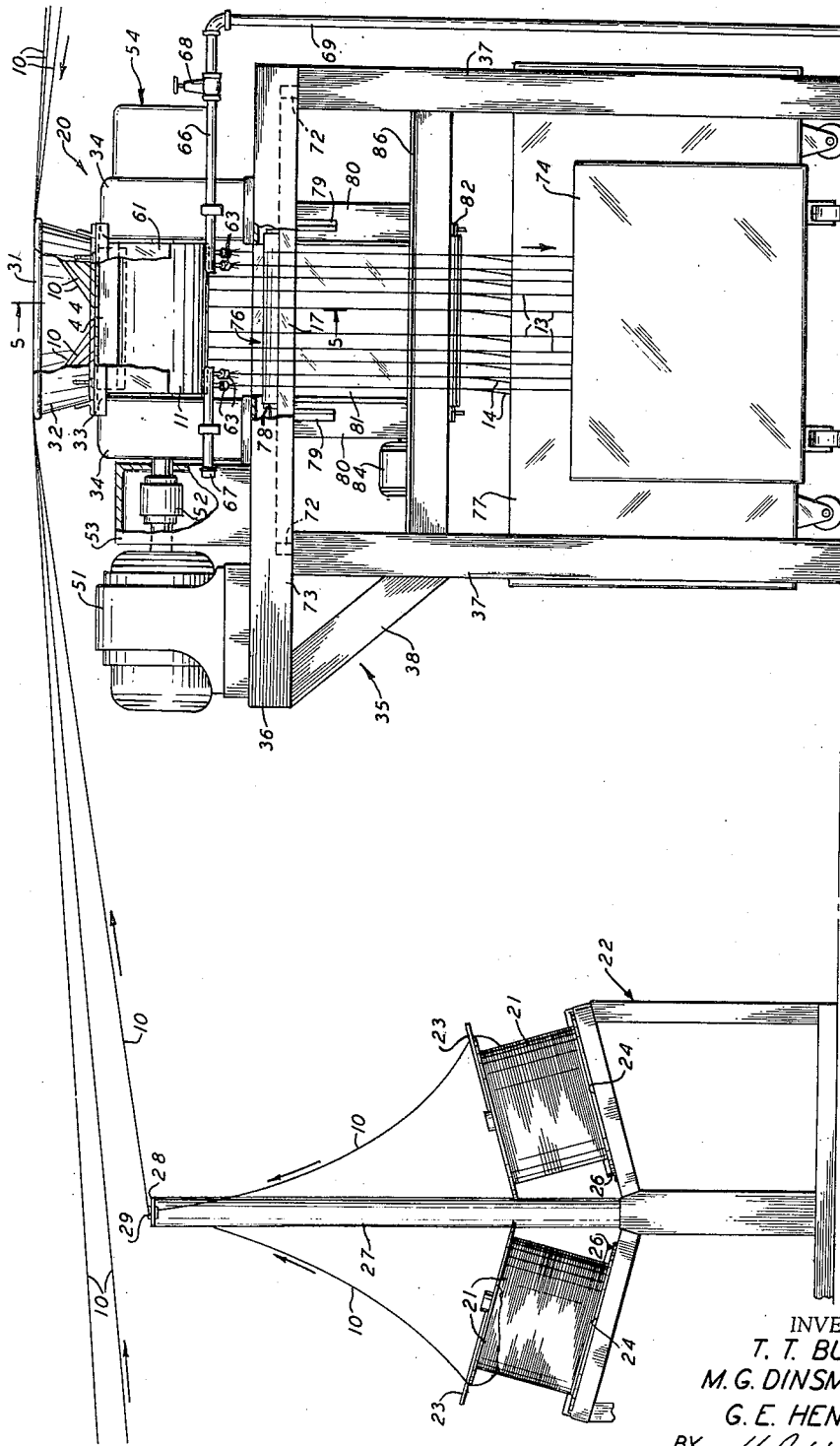
Fig. 4 is a front view of the apparatus illustrated in Fig. 3 having portions broken away to reveal structural details.
Figure 5:
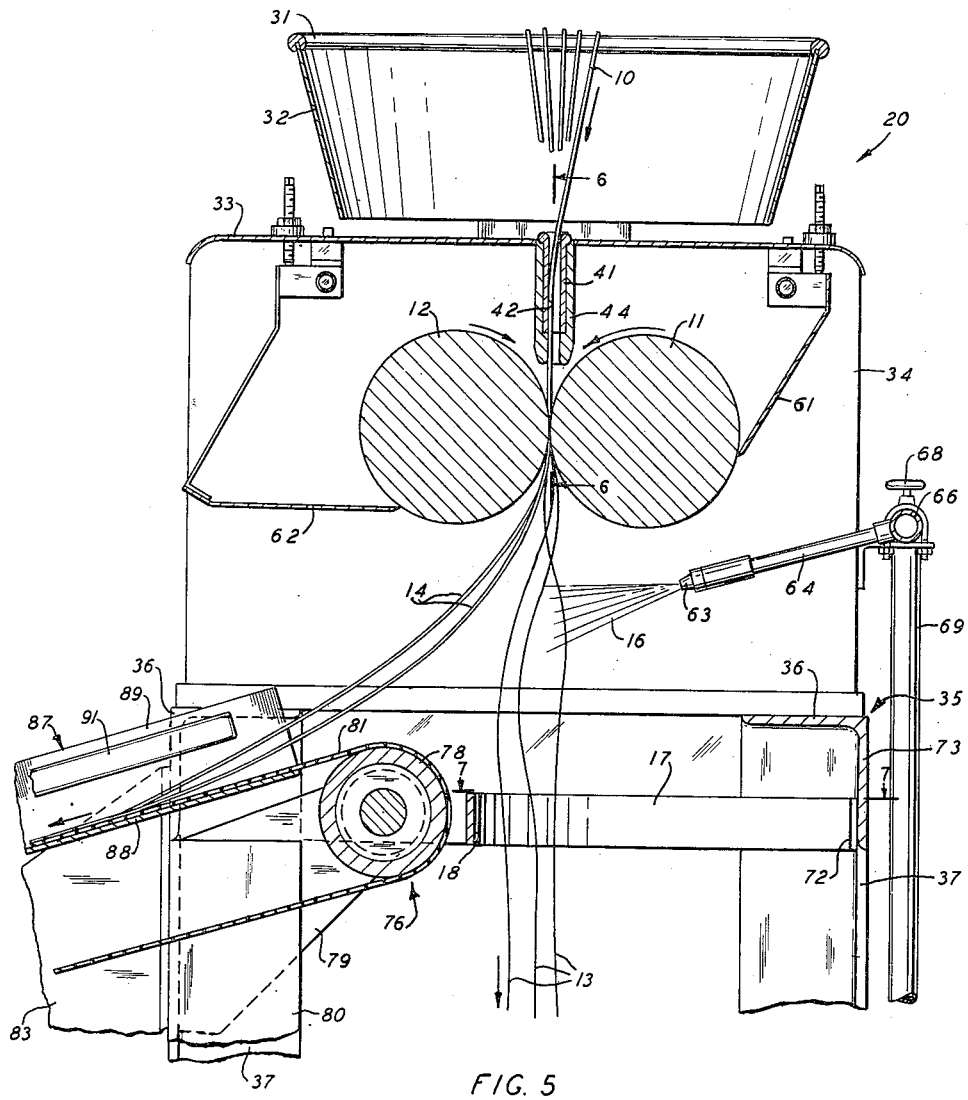

Fig. 5 is an enlarged, vertical section, taken generally along the lines 5—5 of Figs. 3 and 4 in the direction of the arrows showing a portion of the apparatus illustrated in Figs. 3 and 4;

Fig. 6 is an enlarged, vertical section taken generally along the line 6—6 of Fig. 5 in the direction of the arrows, and Fig. 7 is a plan view of a wire-retaining member, taken generally along the line 7—7 of Fig. 5 and being on a reduced scale with respect to Fig. 5.

Referring now in detail to the drawings and in particular to Figs. 1 and 2, a sheathed wire 10 to be stripped is passed from top to bottom, as viewed in Fig. 1, between an opposing pair of crushing rolls 11 and 12. The sheathed wire 10 includes a central, metallic core or wire 13 of a relatively strong nature, such as a copper conductor, surrounded by a jacket or sheath 14 of a plastic material, such as polyethylene or polyvinyl chloride. The sheathed wire 10 is conveniently an insulated wire, particularly a polyethylene-insulated wire, which is not to be used as such for some reason and which is to be reclaimed by stripping the sheath 14 from the wire 13 for reuse of the components or for salvage, separately, as high-grade scrap.

The rolls 11 and 12 are spaced from each other a distance of the order of the diameter of the bare wire 13 and are rotated in opposite directions, as indicated by the arrows in Fig. 1, so that the sheathed wire 10 is pulled therebetween. Since the rolls 11 and 12 are spaced from each other a distance of the order of the diameter of the wire 13, and since the sheath 14 is of a plastic or pressure-deformable material, the rolls 11 and 12 compress the material of the sheath 14 and force it to flow away from the wire 13 on opposite sides thereof, as illustrated in somewhat exaggerated fashion in Fig. 2. It has been determined that, by rotating the rolls 11 and 12 at different peripheral speeds, the sheath 14 is severely worked and splits longitudinally as the sheathed wire 10 passes between the rolls 11 and 12.

Best results are achieved when the peripheral speed of the slower roll 12 is between 70 and 95% of the peripheral speed of the faster roll 11, preferably having a value of about 80% when stripping a polyethylene sheath from a copper wire. Since the rolls 11 and 12 rotate at different peripheral speeds, a tearing action is exerted on the sheath 14 with a vertically downward shearing force being applied by the faster roll 10 to those portions of the sheath 14 adjacent thereto, along the right side of the sheath 14 as viewed in Fig. 1.

Because of the speed differential, those portions of the sheath 14 on the right side of the wire 13 are dragged down by the roll 11 faster than those portions on the left side, and the result is that the sheath 14 splits longitudinally along the right side thereof. The splitting action occurs when the roll 11 has forced the sheath 14 substantially completely away from the wire 13 so that the surface of the roll 11 contacts or substantially contacts the bare wire 13, the sheath 14 being split or cut, in effect, by an opposing nipping action between the wire 13 and the surface of the roll 11.

When the rolls 11 and 12 are spaced apart a predetermined distance, generally slightly less than the diameter of the bare wire 13, the rolls 11 and 12 do not apply sufficient compressive force to split the sheath 14 along the side of the slower roll 12 in addition to the split along the side adjacent to the faster roll 11. As viewed in somewhat exaggerated fashion in Fig. 2, the wire 13 may be deformed into a somewhat flattened shape by the rolls 11 and 12, particularly when they are spaced closer together than the diameter of the wire 13. With this arrangement, the splitting operation is accomplished at room temperature solely by pressure and the forces resultant from the differential speeds, without any heating of the sheathed wire 10 or the rolls 11 and 12 being necessary and without any other preliminary treatment being required. If the rolls are brought sufficiently close together, splitting may be accomplished along both sides; however, this method of operation is not preferred since the wire 13 is unduly deformed, there is an increased tendency for the wire to break, the sheath 14 is unnecessarily compressed, and the two split strips of the sheath 14 resultant from such operation are more difficult to manage.

It is preferred, in actual operation, to adjust the spacing between the rolls 11 and 12 empirically to the largest clearance which will permit continuous splitting of the insulated wire 10 passing therebetween along the one side only. This setting may vary for different cases depending on the hardness of the wire and the properties of the plastic, and for each case is best set empirically by observation to produce the desired result with a minimum of wire deformation and breakage. Generally speaking, the optimum setting is of the order of the diameter of the filament, either equal to or a few percent greater or less than the diameter of the filament.

When a sheath is split longitudinally as described above, there is a tendency for the split sheath 14 to adhere to the bare wire 13. Further, it is desirable to collect the wire 13 and the sheath 14 in separate receivers to enable separate salvage. Accordingly, the split sheath 14 is separated from the bare wire 13 after the splitting operation, and the separated sheath and the bare wire are directed to separate receivers. This may be accomplished, as indicated diagrammatically in Fig. 1, by applying an air current 16 diagonally downward against the split sheath 14 and the bare wire 13 as they emerge from the rolls 11 and 12. Since the sheath 14 is lower in density and presents a greater surface area to the air current 16 than the wire 13, the sheath is carried away from the wire 13 predominantly under the influence of the air movement along the path indicated in Fig. 1, while the wire 13 travels generally vertically downward predominantly under the influence of gravity to a wire receiver positioned generally along a vertical line drawn between the rolls 11 and 12.

Conveniently, the rolls 11 and 12 are the sole means for withdrawing a continuous length of the sheathed wire 10 to be reclaimed from a supply thereof, the split sheath 14 and the bare wire 13 being discharged generally downward thereby into an open space provided therebelow. Since the sheath 14 splits along the side of the faster roll 11, the air blast 16 is directed at the materials emerging from the rolls 11 and 12 from a position on the faster-roll side of a vertical line between the rolls 11 and 12 and just below the roll 11.

With this arrangement, the split sheath 14 is blown downward and to the left, as viewed in Fig. 1, to a receiver positioned below the rolls 11 and 12 some distance to the left of the vertical line between the rolls 11 and 12. The descending bare wire 13 may be restrained against following the path of the air blast 16 and the split sheath 14. For this purpose, a retaining member 17 is provided, having an aperture 18 through which the bare wire 13 advances to the wire receiver. At the start of the stripping operation, the bare wire 13 is passed through the retaining member 17 and, thereafter, the member 17 prevents any tendency of the wire 13 to be blown along the path of the sheath 14 and constrains the wire 13 to pass therethrough to the wire receiver.

Referring now to Figs. 3 to 7, inclusive, illustrating a specific apparatus for practicing the invention, a number of sheathed wires 10—10 to be stripped are simultaneously withdrawn from suitably supply means and fed to a stripping apparatus, designated generally by the numeral 20. The crushing rolls 11 and 12 are mounted within the stripping apparatus 20, as best illustrated in Fig. 5 showing the general arrangement as in Fig. 1, and serve to advance the sheathed wires 10—10. As illustrated in Figs. 3 and 4, ten of the sheathed wires 10—10 may be processed at the same time, with five wires advancing to the stripping apparatus 20 from the right and five such wires advancing from the left.

The sheathed wires 10—10 may conveniently be supplied from a plurality of reels 21—21, four of which are shown in Figs. 3 and 4. The reels 21—21 are stationarily mounted on one end in inclined positions on supply stands, only one of which is illustrated and designated generally by the numeral 22, and the sheathed wires 10—10 are unwound over the free ends of the reels 21—21 due to the pull exerted by the rolls 11 and 12. Each of the reels 21—21 is provided with a revoluble flyer 23 to facilitate the unwinding operation. The supply stand 22 has a pair of opposed, inclined surfaces 24—24 on which the reels 21—21 may be seated, with a plurality of angle irons 26—26 being provided which project upwardly from the surfaces 24—24 to position the reels 21—21 and prevent them from sliding on the inclined surfaces 24—24.

The stand 22 is provided with an upright cylindrical mast 27 having a crossbar 28 at the upper end thereof. The crossbar 28 is provided with a pair of guide bushings 29—29, one at either end thereof as viewed in Fig. 3, which receive the sheathed wires 10—10 being withdrawn from the reels 21—21 and direct them to the stripping apparatus 20. The reels 21—21 at the upper-left and the lower-right of Fig. 3 are illustrated as being operative, while the other two reels 21—21 shown are standby reels to come into service when the operative reels have been fully unwound, since the trailing end of wire from the first reels are spliced to the leading ends of wire on the latter reels. It should be understood that a number of similar supply stands (not shown) are mounted both to the left of the stand 22 shown in Figs. 3 and 4 and to the right of the stripping apparatus 20 to supply the remainder of the ten sheathed wires 10—10 to be stripped.

The wires 10—10 advance horizontally and slightly upwardly, as illustrated in Fig. 4, from the bushings 29—29 to the stripping apparatus 20, passing first around a toroidal upper lip 31 of a collecting funnel 32. As best seen in Fig. 5, the funnel 32 is secured at the top of the apparatus 20 to a cover plate 33, which in turn is secured atop two pairs of upstanding bearing blocks 34—34 (Fig. 4) between which the rolls 11 and 12 are journalled. The bearing blocks 34—34 are mounted on a supporting frame for the entire apparatus, designated generally by the numeral 35 and consisting of a plurality of interconnected angle irons to be described. The frame 35 includes a plurality of horizontal angle irons 36—36, on which the bearing blocks 34—34 are mounted and which are supported about five feet above floor level between the upper ends of four vertical angle irons 37—37 of the frame 35. A pair of bracing angle irons 38—38 (one of which is shown in Fig. 4) are provided to furnish additional support for overhanging portions of the horizontal angle irons 36—36 at the left of the apparatus, as viewed in Fig. 4.

The funnel 32 serves to receive the advancing sheathed wires 10—10 and to direct them downward and inward of the funnel 32 to a plurality of guide bushings 41—41, best illustrated in Figs. 5 and 6. Fig. 6 is taken generally along the line 6—6 in Fig. 5, but toward the left side of the apparatus as viewed in Figs. 3 and 4, and shows the leftmost three bushings 41—41 designed to receive the three sheathed wires 10—10 at the left of Fig. 4.

The bushings 41—41 comprise elongated cylindrical members of wear-resistant material, each having a central bore 42 therethrough for passing the associated sheathed wire 10 to the rolls 11 and 12 along a vertical line drawn therebetween. Each of the bushings 41—41 is provided with a polished bellmouthed entrance aperture 43 (Fig. 6) large enough to pass either wire or wire splices for receiving the associated sheathed wire 10, which is directed thereto at a downwardly slanting angle by the funnel 32.

The bushings 41—41 are supported in spaced, aligned relationship to each other and to the rolls 11 and 12 by the cover plate 33. For this purpose, the cover plate 33 is provided with a general rectangular bar 44 depending therefrom and spaced a short distance above the rolls 11 and 12 along the length thereof, generally between the bearing blocks 34—34 as viewed in Fig. 4. The bar 44 is provided at intervals along the length thereof with a series of counterbored circular apertures 46—46 therethrough (Fig. 6) designed for receiving the guide bushings 41—41 in the desired aligned positions. The sheathed wires 10—10 pass vertically downward through the guide bushings 41—41 and immediately thereafter are nipped between the rolls 11 and 12, which operate as described heretofore with respect to Figs. 1 and 2 to split the sheath 14 longitudinally along the side adjacent to the faster roll 11.

As previously mentioned, the rolls 11 and 12 extend across the width of the apparatus, as illustrated in Fig. 4, between the bearing blocks 34—34 in order to accommodate all ten of the sheathed wires 10—10 at the same time. The faster roll 11 is driven by means of a suitable drive motor 51, which is connected through a coupling 52 to drive the roll 11 from the left end thereof, as viewed in Figs. 3 and 4. The coupling 52 is contained in a housing 53, and both the housing 53 and the motor 51 are mounted on top of the horizontal angle irons 36—36.

A reducing-gear unit, designated generally by the numeral 54, is provided at the right of the right-hand bearing blocks 34—34, as viewed in Figs. 3 and 4, for driving the roll 12 from the roll 11 at an appropriately reduced speed of about 80%, for the purposes described hereinbefore. A shaft 56 (Fig. 3) extends from the faster roll 11 and is provided with a gear 57, which meshes with a larger gear 58 keyed to a shaft 59 of the slower roll 12. By properly selecting the sizes of the meshing gears 57 and 58, the roll 12 is made to rotate at the desired slower speed. The entire slower-roll assembly, including the roll 12, the bearing blocks 34—34 at the top of Fig. 3, the shaft 59 and the gear 58, may be shifted a slight amount to adjust the spacing between the rolls 11 and 12 to the desired value.

As best seen in Fig. 5, a scraping blade 61 is affixed to the cover plate 33 and depends obliquely therefrom to a position adjacent to the roll 11 so as to prevent any of the wires 13—13 from being carried around the roll 11 at any time. Similarly, a second scraping blade 62 is provided to prevent any of the split sheaths 14—14 from travelling around the roll 12.

The air current 16, previously discussed with respect to Fig. 1, is applied against the split sheath 14 and the bare wire 13 emerging from the rolls 11 and 12 by means of a plurality of nozzles 63—63, one of which is clearly illustrated in Fig. 5. Each of the nozzles 63—63 is connected by means of a short pipe 64 to a manifold 66, which is provided with a cap 67 at one end and is connected to a suitable source of compressed air at the other end, as best seen in Fig. 4.

The manifold 66 is connected through a valve 68 to a vertical supply pipe 69 for the compressed air. As previously mentioned, the air current 16 (actually, in the preferred embodiment shown, ten separate air jets merging together) is directed downward and to the left, as viewed in Fig. 5, in order to blow the split sheaths 14—14 away from the bare wires 13—13. Other apparatus, such as a fan, might be employed to blow the sheaths away from the wires, the important factor being the provision of a sufficient volume of air to accomplish the separation.

As viewed in Fig. 5, the wires 13—13 descend generally vertically downward into an open space below the rolls 11 and 12 and pass through the aperture 18 defined by the retaining member 17. The member 17 is made of a thin sheet of metal and is bowed out, as viewed in Fig. 7, to define the aperture 18. The member 17 is provided with turned-out ends 72—72, which are bolted in place to the depending leg 73 of the angle iron 36 at the right of the apparatus, as viewed in Fig. 5.

The retaining member 17 functions to prevent the descending bare wires 13—13 from following the path of the air current 16, despite any tendency to do so. The wires 13—13 descend along various paths, which are indicated somewhat randomly in Figs. 5 and 7 and which may be undulating, depending on the influence exerted by the air current 16. The lines of descension vary between a straight vertical line and an air-blown line wherein the wire 13 engages the inner wall of the aperture 18 defined by the member 17.

After passing through the retaining member 17, the bare wires 13—13 descend into a suitable receiver mounted generally below the rolls 11 and 12, such as an open-topped, wheeled truck 74 illustrated in Figs. 3 and 4. In some instances, it may be possible to eliminate the retaining member 17 entirely, depending on the relative weight of the wires 13—13 and the sheaths 14—14, the magnitude of the air current 16, and the distance the wires 13—13 fall into the truck 74; however, it is preferred to use a member such as 17 to insure that the wires 13—13 are not blown away from the truck 74 by the air current 16.

A conveyor, designated generally by the numeral 76 and best illustrated in Figs. 3 and 5, is preferably provided for carrying the air-blown sheaths 14—14 to a second open-topped truck 77, which is positioned some distance from the first truck 74 and is designed for receiving the sheaths 14—14. The conveyor 76 includes an idler roller 78 (Fig. 5) journalled between a pair of brackets 79—79, which are secured in turn to a pair of short vertical angle irons 80—80 so that they project therefrom, to the right as viewed in Fig. 5. A conveyor belt 81 is passed about the roller 78, is designed to engage the air-blown split sheaths 14—14 and to convey them from right-to-left as viewed in Fig. 5, and from front-to-rear as viewed in Fig. 3, to the truck 77.

As illustrated in Fig. 3, the conveyor belt 81 is driven from a second roller 82, which is journalled for rotation between an opposing pair of brackets 83—83, and forms a part of a second drive motor 84. The brackets 83—83 are also secured to and project, to the left as viewed in Fig. 5, from the vertical angle irons 80—80 of the supporting frame 35. The angle irons 80—80 are secured between the horizontal angle iron 36 at the left of the apparatus, as viewed in Fig. 5, and a second horizontal angle iron 86 (Fig. 4) mounted therebelow. Preferably, the belt 81 is driven at a speed slightly faster than the speed of advancement of the sheaths 14—14 to facilitate conveyance of the sheaths 14—14 to the truck 77.

As best illustrated in Figs. 3 and 5, a trough is provided, designated generally by the numeral 87, which is also secured to the vertical angle irons 80—80 and projects outwardly from the stripping apparatus 20 parallel to the conveyor belt 81. The trough 87 has a bottom plate 88 (Fig. 5) disposed under and in alignment with the upper run of the conveyor belt 81, and a pair of side walls 89—89 extending upward from the bottom plate 88 on either side of the belt 81. The side walls 89—89 stand up some distance above the upper surface of the belt 81 to form, in effect, a trough having the upper surface of the belt 81 as a bottom and designed for constraining the split sheaths 14—14 to follow the upper surface of the belt 81 into the truck 77.

It has been found that the polyethylene sheaths 14—14 tend to pick up an appreciable static charge from the crushing rolls 11 and 12. Consequently, the sheaths 14—14 tend to adhere to the belt 81 and the walls 89—89 of the trough 87 impeding smooth conveyance to the truck 77 and occasionally shocking an operator in the process of rearranging the random piles of sheaths 14—14 in the truck 77. Accordingly, a suitable static eliminator should be provided to insure smooth conveyance and eliminate annoying shocks.

In the embodiment illustrated, an ionized-air type static eliminator is employed comprising two electrodes 91—91, which are mounted to the side walls 89—89 of the trough 87 and face the sheaths 14—14. The electrodes are energized from a suitable A.C. source (not shown) so that the air through which the sheaths 14—14 pass is ionized to neutralize any static charges carried by the sheaths 14—14.

It will be obvious that this invention is not limited to the specific details described in connection with the above specific embodiment of the invention, but that various modifications may be made without departing from the spirit and scope thereof.

What is claimed is:

Apparatus for stripping a sheath of plastic material from a wire, which comprises a source of supply for the sheathed wire; a pair of smooth-surfaced rolls between which the sheathed wire passes arranged so that the sheathed wire passes vertically downward therebetween, said rolls being spaced apart a distance of the order of the diameter of the bare wire; means for rotating said rolls at different peripheral speeds and in opposite directions to withdraw the sheathed wire from said supply source and advance the same between said rolls, to split the sheath longitudinally along the side adjacent to the faster roll as the sheathed wire advances between said rolls, and to discharge the split sheath and the bare wire downward into an open space provided below said rolls; a receiver for the split sheath mounted below said rolls on the side of the slower roll from a vertical line between said rolls; means mounted below said rolls on the side of the faster roll for applying against the split sheath and the bare wire emerging from said rolls an air current directed diagonally downward and away from the faster roll to blow the split sheath away from the bare wire; a belt conveyor for engaging the air-blown sheath and for carrying the same to the receiver therefor; a receiver for the bare wire mounted below said rolls and generally along a vertical line between said rolls, the bare wire descending generally vertically into this receiver; and means mounted between the area of application of the air blast and the wire receiver for restraining the descending bare wire against following the path of the air current and for constraining the bare wire to descend into the receiver therefor.

References Cited in the file of this patent

UNITED STATES PATENTS

| | | |
|---|---|---|
| 1,052,271 | Pessin | Feb. 4, 1913 |
| 2,425,123 | Quayle et al. | Aug. 5, 1947 |
| 2,485,518 | Vermette | Oct. 18, 1949 |
| 2,568,466 | Scott | Sept. 18, 1951 |
| 2,765,685 | Stratman et al. | Oct. 9, 1956 |
| 2,882,188 | Levin et al. | Apr. 14, 1959 |

FOREIGN PATENTS

| | | |
|---|---|---|
| 803,899 | Great Britain | Nov. 5, 1958 |